(12) United States Patent
Batten et al.

(10) Patent No.: US 12,031,934 B2
(45) Date of Patent: Jul. 9, 2024

(54) FOG SENSOR FOR TAILPIPES

(71) Applicant: Thermaco, Inc., Asheboro, NC (US)

(72) Inventors: William C. Batten, Asheboro, NC (US); Sianna Haws, Asheboro, NC (US); Fred Lehman, Asheboro, NC (US); Lee Atkinson, Asheboro, NC (US); Patrick Sturm, Asheboro, NC (US)

(73) Assignee: Thermaco Incorporated, Asheboro, NC (US)

( * ) Notice: Subject to any disclaimer, the term of this patent is extended or adjusted under 35 U.S.C. 154(b) by 250 days.

(21) Appl. No.: 17/623,336

(22) PCT Filed: Jun. 29, 2020

(86) PCT No.: PCT/US2020/040045
§ 371 (c)(1),
(2) Date: Dec. 28, 2021

(87) PCT Pub. No.: WO2020/264465
PCT Pub. Date: Dec. 30, 2020

(65) Prior Publication Data
US 2022/0357297 A1      Nov. 10, 2022

Related U.S. Application Data

(60) Provisional application No. 62/868,410, filed on Jun. 28, 2019, provisional application No. 62/942,584, filed on Dec. 2, 2019.

(51) Int. Cl.
*G01N 27/22* (2006.01)
*E03F 5/16* (2006.01)

(52) U.S. Cl.
CPC .............. *G01N 27/228* (2013.01); *E03F 5/16* (2013.01)

(58) Field of Classification Search
CPC ................................ G01N 27/228; E03F 5/16
See application file for complete search history.

(56) References Cited

U.S. PATENT DOCUMENTS

| 6,423,213 B1 | 7/2002 | Mazurek |
| 6,761,067 B1 | 7/2004 | Capano |
| 6,776,900 B2 | 8/2004 | Mazurek et al. |

(Continued)

FOREIGN PATENT DOCUMENTS

WO   WO 2019/089686   5/2019

OTHER PUBLICATIONS

International Search Report for PCT/US2020/040045 dated Sep. 17, 2020.
Written Opinion for for PCT/US2020/040045 dated Sep. 17, 2020.

*Primary Examiner* — Paresh Patel
(74) *Attorney, Agent, or Firm* — MacCord Mason PLLC

(57) ABSTRACT

An apparatus senses the proportion of FOG flowing with effluent from a sink to a p-trap. A pipe portion is connectable for use as a tailpipe for a sink with a first electrode within the pipe portion and a second electrode outside the pipe portion. Conductors connect the first and second electrodes to a capacitance sensor, so changes in capacitance between the electrodes caused by changes in proportions of FOG content in effluent from the sink can be detected and/or monitored. The monitoring can be remote and can cause an action when an excess FOG content is detected.

15 Claims, 6 Drawing Sheets

(56) References Cited

U.S. PATENT DOCUMENTS

| | | |
|---|---|---|
| 6,951,615 B2 | 10/2005 | Tripodi et al. |
| 7,828,960 B1 | 11/2010 | Batten et al. |
| 8,215,166 B2 | 7/2012 | Cunningham et al. |
| 2004/0195186 A1* | 10/2004 | Nicolia ................ B01D 17/005 |
| | | 210/744 |
| 2005/0029201 A1 | 2/2005 | Rodis |
| 2021/0164215 A1* | 6/2021 | Batten ...................... E03F 5/16 |

* cited by examiner

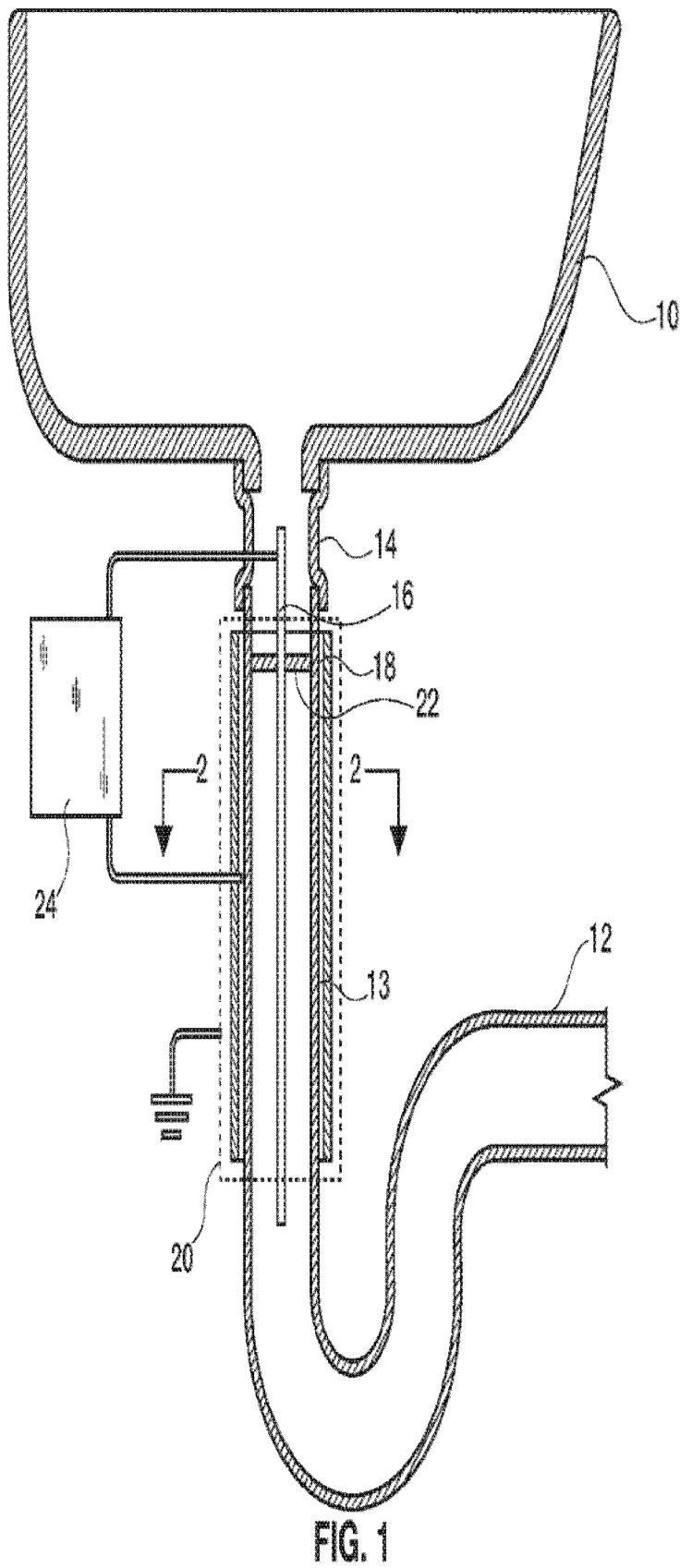
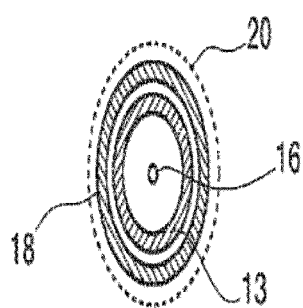
FIG. 1
FIG. 2

FOG SENSOR FOR TAILPIPES

BACKGROUND

Oil, grease and solid waste contaminant removal or recovery systems are well known in the prior art. Sewer system lines can become clogged from the fats, oil and grease waste materials (hereinafter referred to as "FOG") put into the sewer system from food handling facilities. This has led more and more sewer authorities to implement fats, oils and grease control programs. Over the past thirty years there has been a steady move towards requiring commercial food handling facilities to have systems for servicing kitchen grease and solid waste bearing water flows.

Apartment complexes are now the number one FOG threat to municipal sewer systems as consumers cooking in their apartments flush FOG down their kitchen drains. There is a need for a sensor for determining when excessive FOG has been disposed of by dumping into a residential kitchen sink drain (or other drain).

SUMMARY

The present invention fulfills one or more of these needs in the art by providing an apparatus for sensing the proportion of FOG flowing with effluent from a sink to a p-trap includes a pipe portion connectable for use as a tailpipe for a sink, a first electrode within the pipe portion, a second electrode outside the pipe portion, and conductors connecting the first and second electrodes to a capacitance meter. Changes in capacitance between the electrodes caused by changes in proportions of FOG content in effluent from the sink can be detected.

Other aspects may include a method of sensing the proportion of FOG flowing with effluent from a sink to a p-trap, including: Allowing a flow of effluent downward from the sink through a pipe portion; sensing the capacitance of the effluent flowing downward from the sink through a pipe portion to determine capacitance of low-FOG effluent; sensing the capacitance of the effluent flowing downward from the sink through the pipe portion to determine capacitance of high-FOG effluent to establish a threshold, and determining in subsequent effluent flows if the capacitance exceeds the threshold, indicating a high-FOG flow or an accumulation of FOG.

Some embodiments include a monitoring system for FOG disposal in a facility, including a capacitance apparatus, an evaluation system, and a reporting system. The capacitance apparatus may include a first electrode for fitting inside a pipe portion situated between a sink drain and a p-trap, and a second electrode for fitting outside the pipe portion. The first electrode may extend upward from a p-trap, centered in the pipe portion. Conductors may connect the first and the second electrodes to a capacitance sensor. An electrical supply may be in communication with the capacitance apparatus. An evaluation system may include an evaluation module. An evaluation module may be in communication with the capacitance sensor. The evaluation module may be adapted to: receive a measured capacitance measurement, compare a set of capacitance measurements over time, determine a common state measurement, compare a capacitance measurement to a set threshold tolerance level related to the common state measurement to determine a change of capacitance resulting from an amount of FOG displacing water. A reporting system may be included.

In some examples of a capacitance apparatus the pipe portion housing the capacitance apparatus is upstream of the p-trap. The sensor may also be situated at a weir height level. In some embodiments the sink drain and the p-trap are part of a drain line and a valve is positioned in the drain line that closes to close the drain line when the evaluation module determines that excess FOG has passed through the drain line.

A reporting system may be included with a first level record including a report for one capacitance sensor, a second level record including a report from more than one capacitance sensor, and/or a third level record including reports of all capacitance sensors active in a given location, such as an apartment building. The reporting system may include a remote monitoring agency in communication with the monitoring system. The monitoring agency may receive a reporting data for a selection of capacitance sensors. The monitoring agency may be a third party agency.

In another example a grease trap for collecting FOG in effluent so that the FOG does not pass downstream to a sewer includes a tank having inlet and outlet inverts, a capacitance apparatus affixed to the outlet invert to sense FOG in the outlet inert, and a monitoring system connected to the capacitance apparatus. When the grease trap is nearing its capacity condition and passes an increasing amount of FOG such increase in FOG can be sensed and reported by the monitoring system, so that removal of the FOG from the grease trap can be initiated.

BRIEF DESCRIPTION OF THE DRAWINGS

The invention will be better understood by a reading of the Detailed Description of the Examples along with a review of the drawings, in which:

FIG. 1 is a sectional schematic view of a sink equipped with an example;

FIG. 2 is a sectional view of the embodiment of FIG. 1 taken along lines 2-2 and looking in the direction of the arrows;

DETAILED DESCRIPTION OF EXAMPLES

Figure 3:
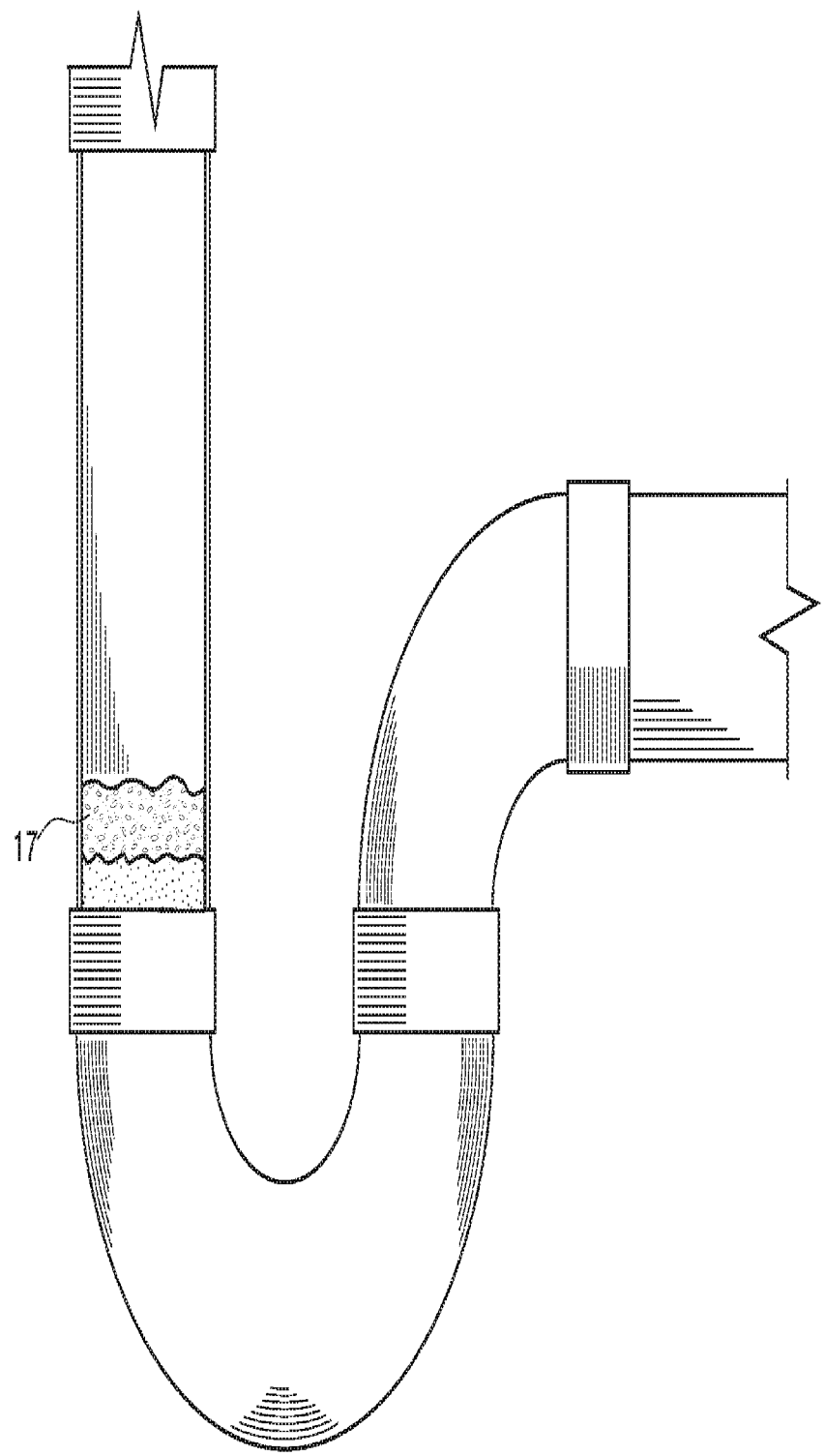
FIG. 3 is a side view showing FOG in a riser.

As used herein the term sink includes ware washing sinks in commercial kitchens and residential kitchens and sinks generally that are equipped with drains that lead to a sewer line (or septic tank).

The examples include a method and apparatus to determine when a significant amount of grease and oils have entered into a drain of a sink. Sink drains almost universally have p-traps, and the p-traps are connected below the sink drain, attached to a tailpiece connected to the drain of the sink. The trap collects effluent, forming a barrier to prevent backflows of sewer gas. The piping upstream of the p-trap thus creates a place where effluent slows and collects. Placing a sensor for the content of the effluent at that general location enables the FOG to collect, if present, and for the sensor to have time to sense the nature of the effluent.

As seen in FIG. 1, a sink 10 has a tailpiece 14 connected to a p-trap 12. The p-trap 12 has a vertical riser 13. A support 22 within the riser 13 supports a first electrode 16 that is electrically connected to a capacitance meter 24 which can include or be connected to a data collector. Preferably, the first electrode 16 is centered in the riser 13. A second electrode 18 is cylindrical and surrounds the riser 13. Electrode 16 is also electrically connected to a capacitance meter and data collector 24, so that the capacitance between the two electrodes can be measured. While the capacitor made up by the electrodes preferably has co-axial electrodes, other electrode arrangements can be used if reliable readings of tailpiece contents can be made.

An optional grounding electrode 20 with insulation (not shown) to the second electrode may be included as a Faraday cage. In one set of tests, capacitance values for a simple water filled pipe are around 70 pF tests using the Faraday cage as a shield. In tests without the Faraday cage, readings of 30 pF were obtained. When oil is added, the shielded capacitance values changed by approximately 10 pF, while the unshielded changes by only 4 or 5 pF, so the presence of the Faraday cage makes the discrimination of the tailpiece contents more reliable.

The capacitance measured by this apparatus is dependent on the power it is being supplied, the geometry of the capacitor itself, and the dielectric material present between the two electrodes components. For the capacitor as described the first electrode is the negatively charged conductive rod 16 placed inside and the second is the positively charged conductive copper cylinder 18. The power supplied and geometry of the capacitor remained constant and the fluid flowing through the riser was changed. Therefore, the change in measured capacitance is solely dependent on the dielectric properties of the fluid present between the electrodes at that time.

The electrical system 24 supplies power to the system (which may be alternating current and may have variable frequency) and then reads the measured capacitance in samples over time. These measurements assess when noticeable changes of overall device capacitance occur and in what range. The system may compare samples from various times to determine a "common state" for the system establishing a threshold for dictating what a "FOG event" should be. That is, variations of capacitance reading that differ from the common state by a margin can be deduced to indicate the presence of excess FOG, which can be labeled a "FOG event." Known capacitance values for soaps, detergents and various food solids can similarly be utilized to determine their volumes introduced via the drain in the sink 10. The solids in the effluent typically have capacitance readings closer to those of water than FOG.

Locating the sensor apparatus to be upstream from the p-trap, especially to be at the weir height determined by the downstream portion of the p-trap is helpful. When FOG itself or even a FOG-water mixture is poured down the drain, FOG will float to the top of the liquid that is resident in the upstream leg of the p-trap (demonstrated in FIG. 3). This placement is due to the 180 degree turn of the trap itself and the lower specific gravity of FOG compared to water. Thus, the FOG floats on water held in the upstream leg of the p-trap. The capacitor sensing assembly upstream the P-Trap at the weir height enables monitoring of a targeted volume of fluids. The ratio of the fluids will change, which changes the measured capacitance (for example, the common state may be the result of 90% water in the volume between the sensor and 10% air, while a FOG event would result in 70% water, 20% FOG, and 10% air). The section of air can be helpful in case any change in weir height occurs, but should generally stay constant, so it will not likely change capacitance readings.

If the sink is flooded with water after a FOG event, the FOG washes downstream through the tailpiece, riser and p-trap, bringing the capacitance back to the reading prior to the FOG event (the common state). Various changes in the monitoring system will allow observations of both when a FOG event occurs and then is flushed away, as well as when a FOG event occurs and is left in place.

Figure 4:
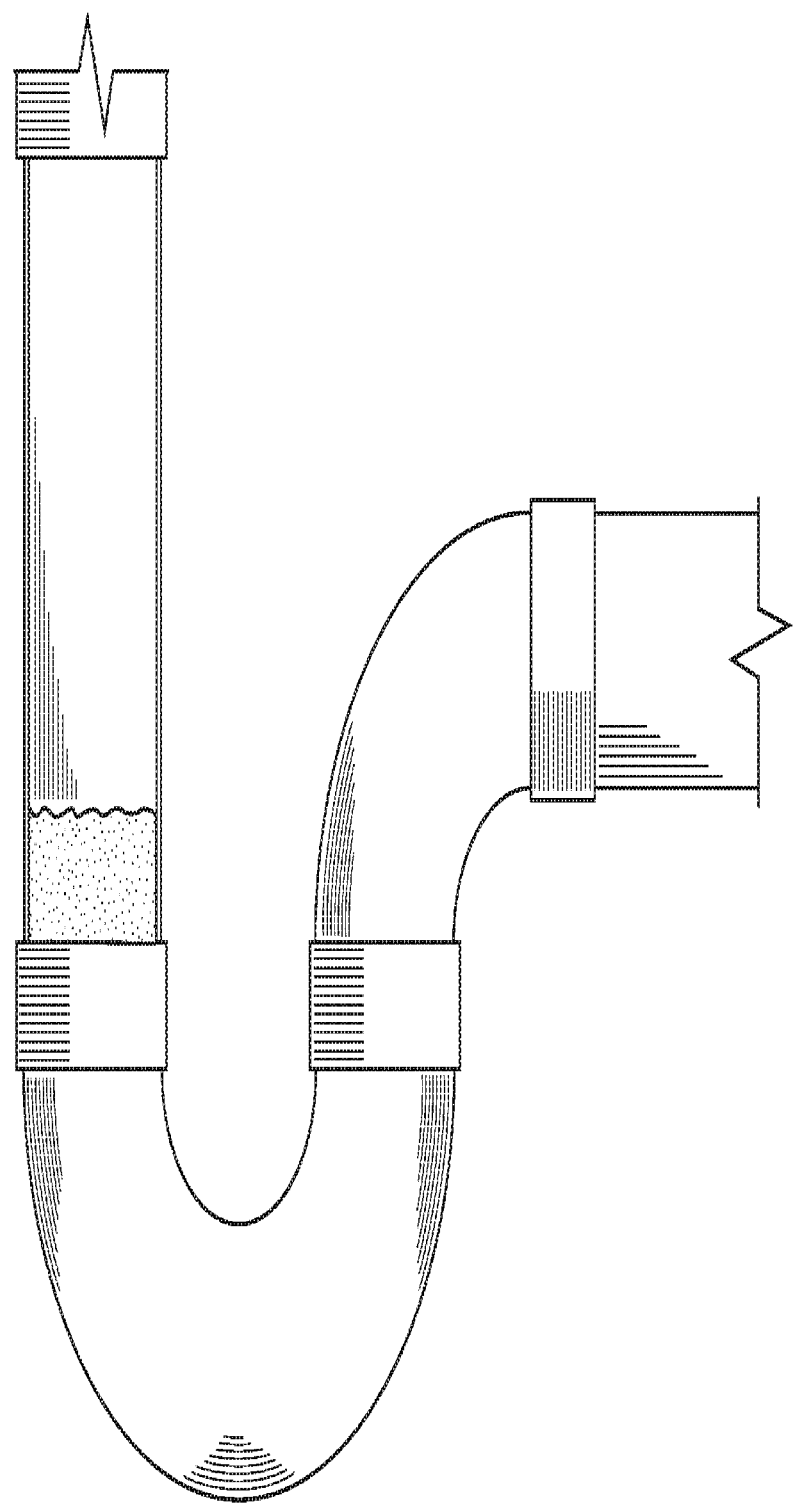
FIG. 4 is a side view showing the flushed riser.

FIG. 3 is a photo showing FOG 17 in a riser, and FIG. 4 shows the flushed riser, the result of flushing water through the sink.

Figure 5:
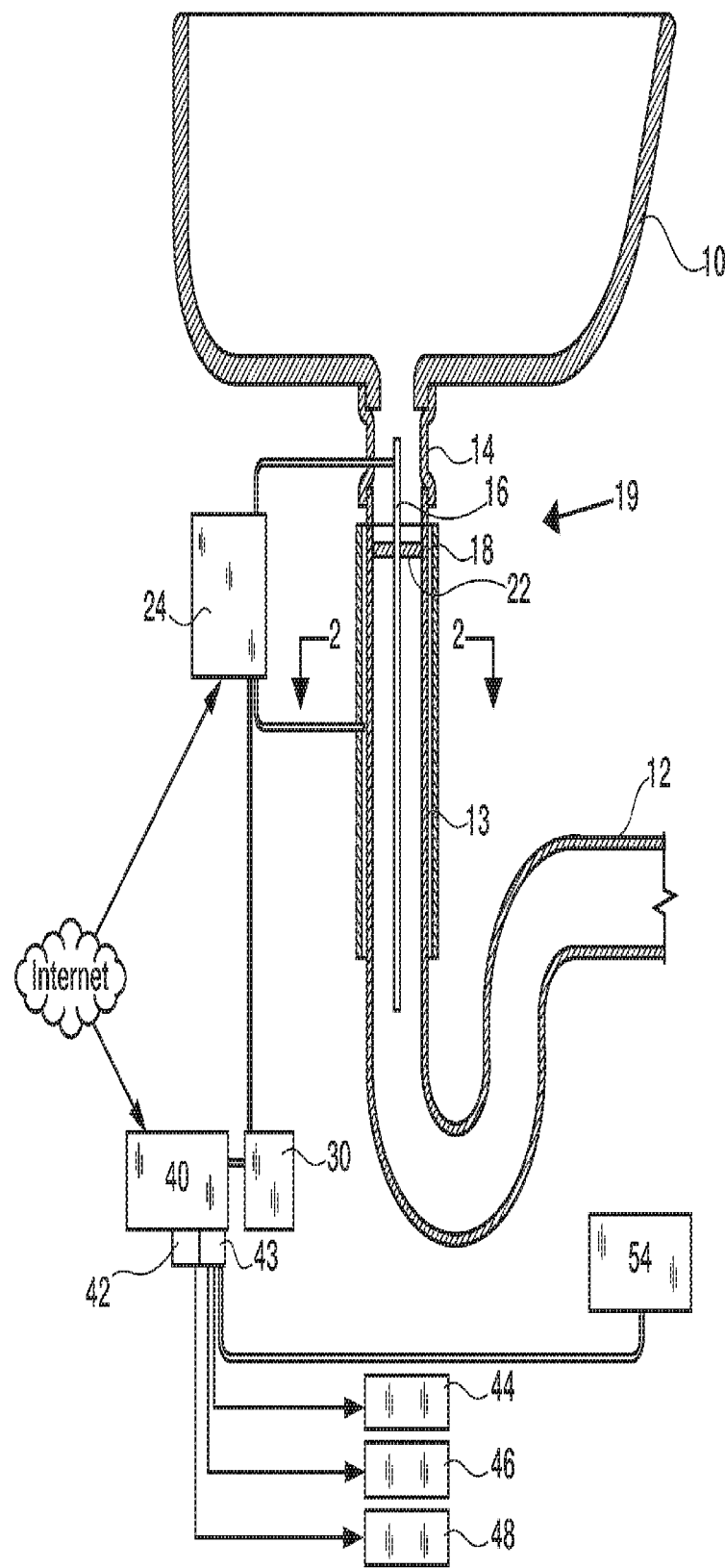
FIG. 5 is a schematic view of a sink with a monitoring system for FOG.

FIG. 5 shows a monitoring system for FOG disposal in a facility, including a capacitance apparatus 19, an evaluation system 40, and a reporting system 43. The capacitance apparatus 19 may include the components shown in connection with FIG. 1, namely a first electrode 16 for fitting inside a pipe portion situated between a sink drain and a p-trap 12, and a second electrode 18 for fitting outside the pipe portion 14. Conductors connect the first and the second electrodes 16, 18 to a capacitance sensor 24.

An electrical supply 30 may be in communication with the capacitance apparatus 19 and/or a data collector 24. An evaluation system 40 may receive data from the data collector via various connections, such as hardwired or over the internet using cellular or Wi-Fi signals to a remote station. The system 40 can include an evaluation module 42. Thus, the evaluation module receives data, at least indirectly, from the capacitance sensor. The evaluation module may be adapted to: receive a measured capacitance measurement, compare a set of capacitance measurements over time, determine a common state measurement, compare a capacitance measurement to a set threshold tolerance level related to the common state measurement, determine a change of capacitance resulting from an amount of FOG displacing water. The evaluation module can include a reporting system.

A reporting system 43, in some examples, may include a first level record 44 including a report for one capacitance sensor 19, a second level record 46 including more than one capacitance sensor 19, and/or a third level record 48 including all capacitance sensors 19 in a given location. In a particular deployment, the various capacitance sensors that are connected to the reporting system are installed in sink drains in an apartment building, so that FOG levels passing the multiple sink drains can be monitored, and aggregated or compared. The reporting system 43 may include a remote monitoring agency 54 in communication with the monitoring system 43. The monitoring agency may receive a reporting data for a selection of capacitance sensors. The monitoring agency may be a third party agency.

Figure 6:
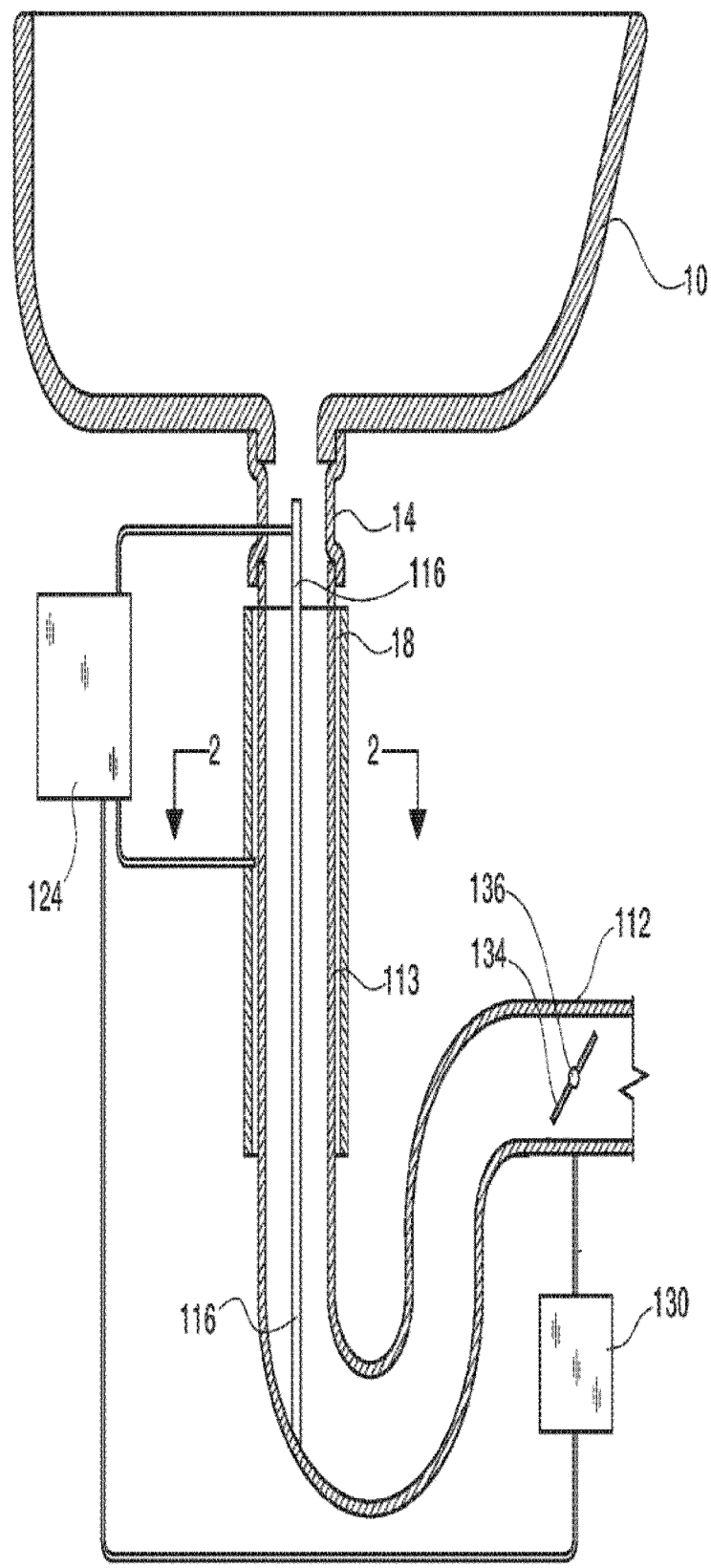
FIG. 6 is a sectional schematic view of a sink equipped a control apparatus.

FIG. 6 is a sectional schematic view of a sink equipped with another. This example differs from the example seen in FIG. 1, in that the first electrode 116 is mounted in the p-trap 112, extending upward from the p-trap 112 and centered in the riser 113. This type of mounting of the center electrode can be also used in the earlier-mentioned examples, and the FIG. 1 mounting can be used in the FIG. 6 example.

The FIG. 6 apparatus includes valve 134 in the drain line that can be closed when data collected by the data collector 124 indicates that an abnormally high amount of FOG has passed through the drain. For example, a signal from the data collector 124 may actuate a solenoid 130 that extends a crank arm to cause the valve 134 to pivot about a pivot mount 136. The indication that an abnormally high amount of FOG has passed through the drain suggests a sink user who pours abnormally high amounts of FOG down the drain and would benefit from education about proper drainage habits. When the drain is closed by the valve 134, the sink user will call a maintenance person who can open the valve and use the visit to the drain user to provide education and encouragement to better drainage habits by the user to curtail the discharge of FOG down the drain.

Another control functionality enabled by the addition of the sensor into a p-trap provides a basis for a using the Internet of Things and/or Cloud reporting for monitoring each residential sink in an apartment complex. That data can also be used to indicate a sink user who pours abnormally high amounts of FOG down the drain and would benefit from education and encouragement about proper drainage habits.

Figure 7:
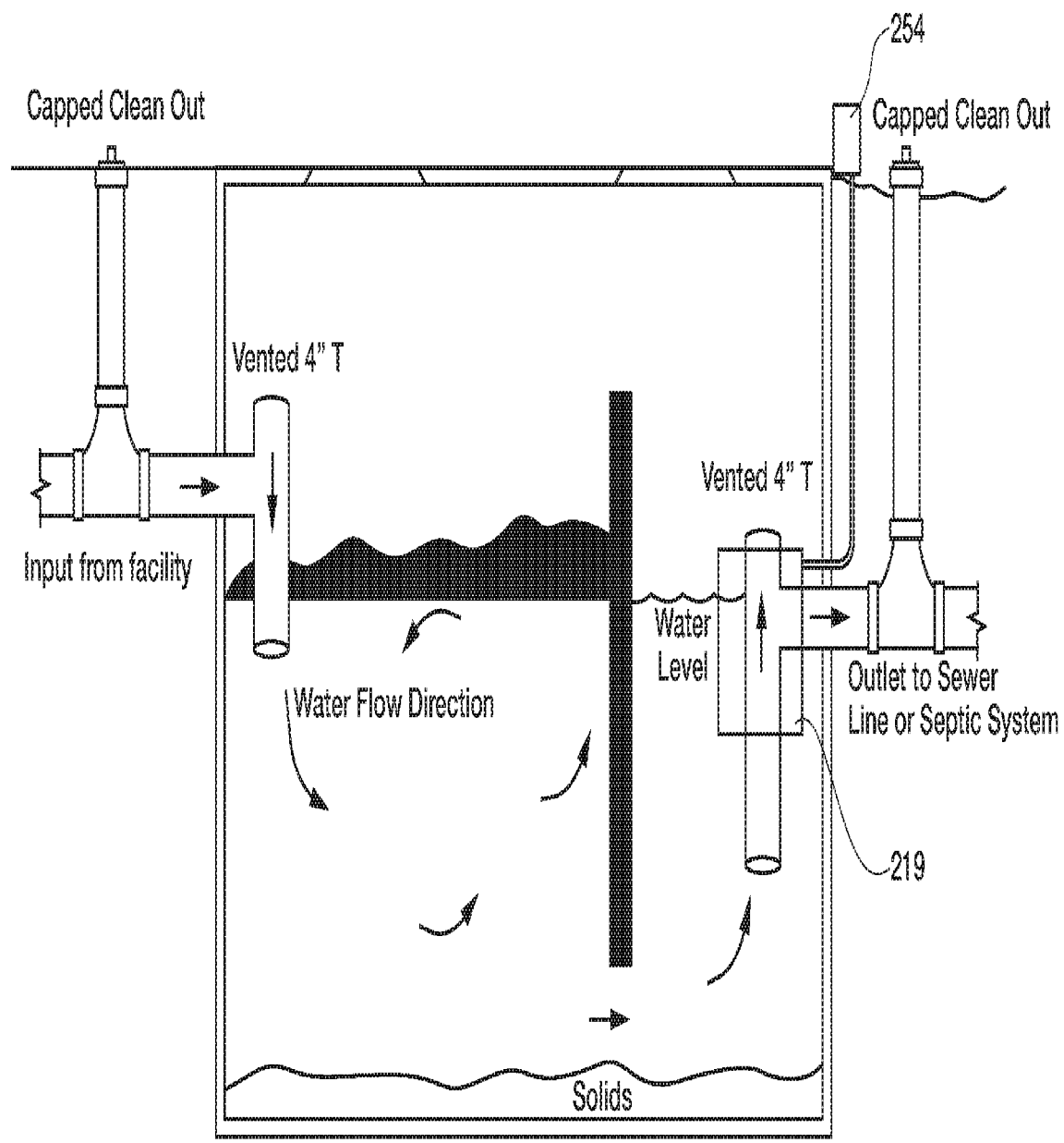
FIG. 7 is a sectional view of a grease trap equipped with a sensor.

FIG. 7 shows another example. In this example a grease trap having conventional inlet and outlet inverts is used to collect FOG in effluent so that the FOG does not pass downstream to a sewer. The outlet invert is provided with a capacitance apparatus 219 (using one of the structures and connections described in the earlier examples) and the capacitance apparatus 219 is connected to a monitoring system 254. While grease traps can be very effective in collecting FOG, when they reach their FOG capacity, increasing amounts of FOG slip past the trap and can make their way to the sewer. Using the capacitance apparatus 219 connected to a monitoring system 254 enables this "nearing capacity" condition to be sensed, so that removal (usually by pumping) of the FOG from the grease trap can be initiated.

Certain modifications and improvements will occur to those skilled in the art upon reading the foregoing description. It should be understood that all such modifications and improvements have been omitted for the sake of conciseness and readability but are properly within the scope of the following claims.

What is claimed is:

1. An apparatus for sensing the proportion of FOG flowing with effluent from a sink to a p-trap comprising
   a pipe portion connectable for use as a tailpipe for a sink,
   a first electrode within the pipe portion,
   a second electrode outside the pipe portion, and
   conductors connecting the first and second electrodes to a capacitance sensor,
   whereby changes in capacitance between the electrodes caused by changes in proportions of FOG content in effluent from the sink can be detected.

2. The apparatus of claim 1 including a Faraday cage around the second electrode.

3. The apparatus of claim 1 wherein the first electrode is centered in the pipe portion.

4. The apparatus of claim 1 wherein the first electrode extends upward from a p-trap and is centered in the pipe portion.

5. The apparatus of claim 1 wherein the second electrode is cylindrical and co-axial with the first electrode.

6. The apparatus claim 1, wherein the electrodes are is situated at a weir height level.

7. The apparatus of claim 1, wherein the pipe portion is upstream of a p-trap.

8. A monitoring system for FOG disposal in a facility, comprising:
   a capacitance apparatus, including:
      a first electrode for fitting inside a pipe portion situated between a sink drain and a p-trap,
      a second electrode for fitting outside the pipe portion,
      conductors connecting the first and the second electrodes to a capacitance sensor,
   an electrical supply in communication with the capacitance apparatus,
   an evaluation module in communication with the capacitance sensor adapted to:
      receive a capacitance measurement,
      compare a set of capacitance measurements over time,
      determine a common state measurement,
      compare a capacitance measurement to a set threshold tolerance level, related to the common state measurement, to determine a change of capacitance resulting from an amount of FOG displacing water.

9. The monitoring system of claim 8 further comprising a reporting system.

10. The monitoring system of claim 9, wherein the reporting system includes a first level record including a report for one capacitance sensor.

11. The monitoring system of claim 9, wherein the reporting system includes a second level record including more than one capacitance sensor.

12. The monitoring system of claim 9, wherein the reporting system includes a third level record including all capacitance sensors active in a given location.

13. The monitoring system of claim 9, wherein the reporting system includes a remote monitoring agency in communication with the monitoring system and receiving a reporting data for a selection of capacitance sensors.

14. The monitoring system of claim 13, wherein the remote monitoring agency is a third party agency.

15. The monitoring system of claim 8, wherein the sink drain and the p-trap are part of a drain line and further comprising a valve in the drain line that closes to close the drain line when the evaluation module determines that excess FOG has passed through the drain line.

* * * * *